United States Patent [19]

Giuggio et al.

[11] 4,139,414
[45] Feb. 13, 1979

[54] SCRAM DEVICE HAVING A MULTIPLICITY OF NEUTRON ABSORBING MASSES

[75] Inventors: Nicholas Giuggio, East Longmeadow, Mass.; Richard C. Noyes, New Britain, Conn.

[73] Assignee: Combustion Engineering, Inc., Windsor, Conn.

[21] Appl. No.: 805,263

[22] Filed: Jun. 10, 1977

[51] Int. Cl.² .............................................. G21C 7/22
[52] U.S. Cl. .................................. 176/86 R; 251/1 R; 251/212; 176/36 R
[58] Field of Search ...................... 176/22, 36 R, 86 R; 251/1 R, 212

[56] References Cited

U.S. PATENT DOCUMENTS

| | | | |
|---|---|---|---|
| 3,105,033 | 9/1963 | Camac | 176/22 |
| 3,192,123 | 6/1965 | Costes et al. | 176/86 R |
| 3,377,252 | 4/1968 | Knights | 176/36 R |
| 3,733,251 | 5/1973 | Gilbertson et al. | 176/36 R |

FOREIGN PATENT DOCUMENTS

| | | | |
|---|---|---|---|
| 890661 | 3/1962 | United Kingdom | 176/22 |
| 891799 | 3/1962 | United Kingdom | 176/22 |
| 897455 | 5/1962 | United Kingdom | 176/22 |
| 897456 | 5/1962 | United Kingdom | 176/22 |
| 1313188 | 4/1973 | United Kingdom | 176/36 R |

*Primary Examiner*—Harvey E. Behrend
*Attorney, Agent, or Firm*—Lombro J. Ristas

[57] ABSTRACT

An apparatus for holding, releasing, and resetting a multiplicity of neutron absorbing balls within a safety assembly of a liquid metal nuclear reactor comprising vertically hinged trap doors resting on the shoulders of a generally cylindrical release valve, the actuation of which disengages the doors, permitting the poison balls above the doors to drop into the core. In the reset mode of operation a platform is raised, lifting the balls from the bottom of the core and swinging the trap doors upward until the balls are above the door hinges. The release valve is reset and the platform is lowered to reset the doors against the valve shoulders. In the disclosed embodiment, the valve is operated by a self-actuated, temperature responsive scram mechanism.

7 Claims, 7 Drawing Figures

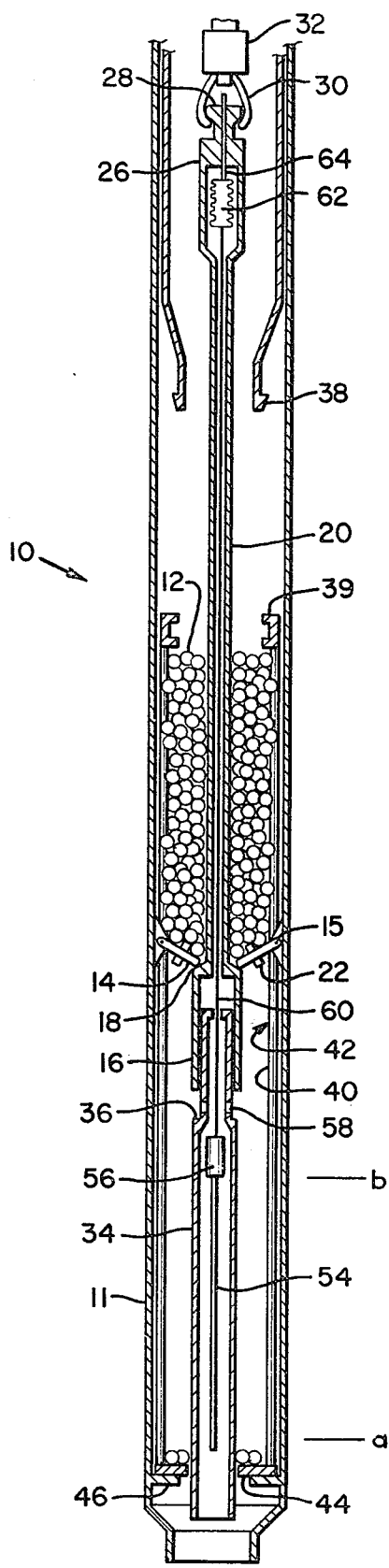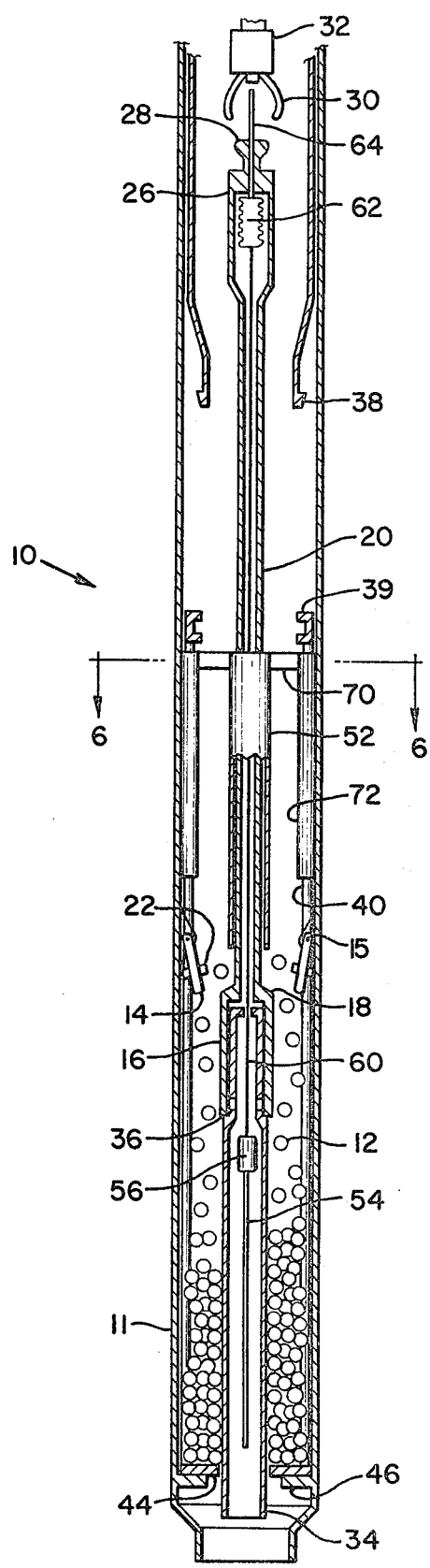

SCRAM DEVICE HAVING A MULTIPLICITY OF NEUTRON ABSORBING MASSES

BACKGROUND OF THE INVENTION

The invention relates to shutdown mechanisms for nuclear reactors, and in particular to poison release mechanisms for reactors of the liquid metal type.

It is known in the art of nuclear reactor control to use a multiplicity of small neutron absorbing masses, usually stainless steel spheres or the like, to rapidly shutdown (scram) the nuclear chain reaction on the occurrence of a severe accident. Because of the difficulties associated with resetting the masses after a scram, these prior art devices are usually provided in the nuclear reactor as a final safeguard against the most serious kinds of accidents, such as earthquakes or other events that might physically damage the regular shutdown system. Thus these devices have not been disclosed as having means for easily resetting the masses for renewed core operation, since it has been implicitly assumed that significant damage to the reactor has occurred, that repairs will be required, or that a prolonged testing period will be needed before operation can resume. During these prolonged outages, the prior art devices can be repaired or replaced, but they cannot be quickly reset if they scram inadvertently during normal operation or if they are actuated for test purposes. Examples of such prior art devices are described in U.S. Pat. Nos. 3,088,903 issued to A. Firth; 3,147,188 issued to R. H. Cambell; and 3,249,510 issued to A. J. Dohm, Jr. et al.

SUMMARY OF THE INVENTION

It is an object of the present invention to provide a scram system utilizing a multiplicity of neutron absorbing masses that can be used for routine scram incidents. It is a related object of the invention to provide for simple resetting of the scram device following a scram. It is a further object of the invention to provide a scram system that can be self-actuated from within the safety assembly for dropping a multiplicity of neutron absorbing masses into the reactor core.

The present invention is an apparatus for holding, releasing and resetting a multiplicity of neutron absorbing balls within a safety assembly of a liquid metal nuclear reactor. Vertically hinged trap doors rest on the shoulders of a generally cylindrical release valve which is actuated either by the regular or self-actuated scram actuator. The doors and the valve shoulder provide a floor for the multiplicity of balls to be suspended above the reactor core during normal operation. When the actuator displaces the release valve, the doors lose their support and swing downward, permitting the poison balls to drop into the core. In the reset mode of operation, a platform at the bottom of the core is raised to lift the balls and swing the trap doors upward until the balls are above the door hinges. The release valve is reset to support the doors and the platform is lowered to the bottom of the safety assembly.

The invention can be used as part of the regular scram system and is adaptable for use in conjunction with a variety of self-actuating scram devices used for backup scram control.

BRIEF DESCRIPTION OF THE DRAWINGS

FIG. 1 shows an elevation view of the safety assembly containing the invention.

FIG. 2 shows an elevation view of the invention in the scram position.

DESCRIPTION OF THE PREFERRED EMBODIMENT

Figure 3:
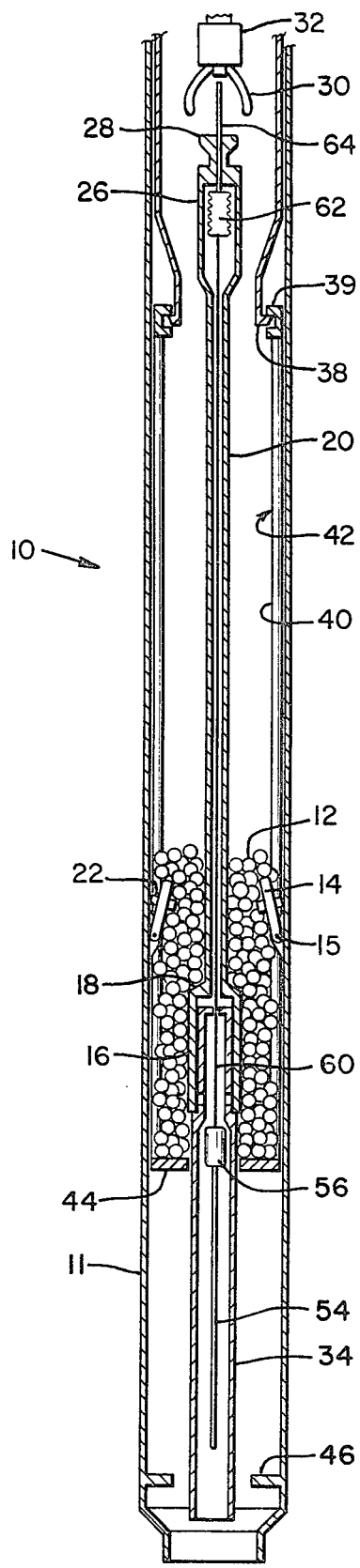
FIG. 3 shows an elevation view of the invention in the reset mode following a scram.

The present invention may be used in the regular scram system of a safety assembly of a liquid metal cooled nuclear reactor, in self-actuated scram systems, or in systems having both regular and self-actuated scram modes. The embodiment of the invention described below contemplates use in both the regular and self-actuated scram modes of operation. Operation in the regular scram mode will first be described, followed by a description in the self-actuated scram mode.

Referring now to FIG. 1, a safety assembly 10 is shown having its lower portion located in the core of liquid metal nuclear reactor, wherein elevations a and b designate the extent of the power producing region, or core, of the reactor. The safety assembly consists of a safety duct 11, which is typically hexagonal, wherein is contained a multiplicity of neutron absorbing poison balls 12. In the preferred embodiment the balls are generally spherical and are made of tantalum, but other materials such as stainless steel and other shapes having rounded corners may also be used. Within the safety duct 11 at an elevation above the top of the reactor core (b) six generally triangular trap doors 14 are attached by hinges 15 to the safety duct 11 and are free to swing up and down.

A hopper valve 16 of generally cylindrical shape except for an upper portion having upwardly sloped valve shoulders 18 is located along the axis of the safety duct 11 at an elevation whereby the portions of the trap doors 14 opposite the hinges 15 rest on the valve shoulder 18. The trap doors 14 and valve shoulder 18 effectively occupy the entire cross-section of the safety duct 11 in the vicinity of the hinges 15, thereby providing a floor for supporting the multiplicity of poison balls 12 in a position above the reactor core.

The hopper valve 16 is supported against the weight of the doors 14 and balls 12 by a connection to the release gripper 30 located in the upper portion of the safety assembly 10. A support rod 20 is attached at its bottom to the valve shoulder 18 and at its top to actuator housing 26. The top of the actuator housing is formed into a knob 28 which is held up by the release gripper 30. In an alternate embodiment that does not include a self-actuated scram mode of operation, the support rod 20 can be a solid rod having a knob 28 formed at its top. In the illustrated embodiment, support rod 20 is hollow and contains other structure to be more fully described in connection with the self-actuated mode of operation.

Referring now to FIG. 2, a regular scram occurs when the pneumatic latch 32 actuates the release gripper 30, disengaging knob 28 so that the weight of the balls 12 and the support rod 20 release the hopper valve 16 downwards to the valve stop 36. The trap doors 14 thereby lose the support of the valve shoulder 18, rotating downward to permit the balls 12 to drop. The door stops 22 maintain the doors at angles of 10 to 20° from the vertical when the doors are fully opened. The operation of the pneumatic latch 32 is fully described in U.S. Pat. No. 3,733,251 issued to J. C. Gilbertson et al, which is hereby incorporated by reference. It is evident that any well known means of selectively holding or releasing a scram poison rod can be substituted for the pneumatic latch 32.

When the reactor operator is ready to reset the balls preparatory to resuming core operation, the lift gripper 38 is lowered from the top of the safety assembly 10 by any suitable lifting means (not shown) whereby the lift gripper 38 engages the notches 39 on lift arms 40 of the lifting carriage 42. The lower portion of the lift carriage 42 includes a platform 44 having a cross-section that acts as a floor on which the balls 12 rest after a scram.

Referring now to FIG. 3, as the lift gripper 38 is raised, the upward motion of the platform 44 raises the balls towards the trap doors 14 and as the balls 12 move past the trap doors 14, they contact the underside of the trap doors 14 and lift the doors 14 to a near vertical orientation. When the platform 44 reaches the level of the hinges 15 the pneumatic latch 32 is lowered until the release gripper 30 engages the knob 28 and then lifts the hopper valve 16 until the valve shoulder 18 returns to its initial position for supporting the trap doors 14.

Figure 4:
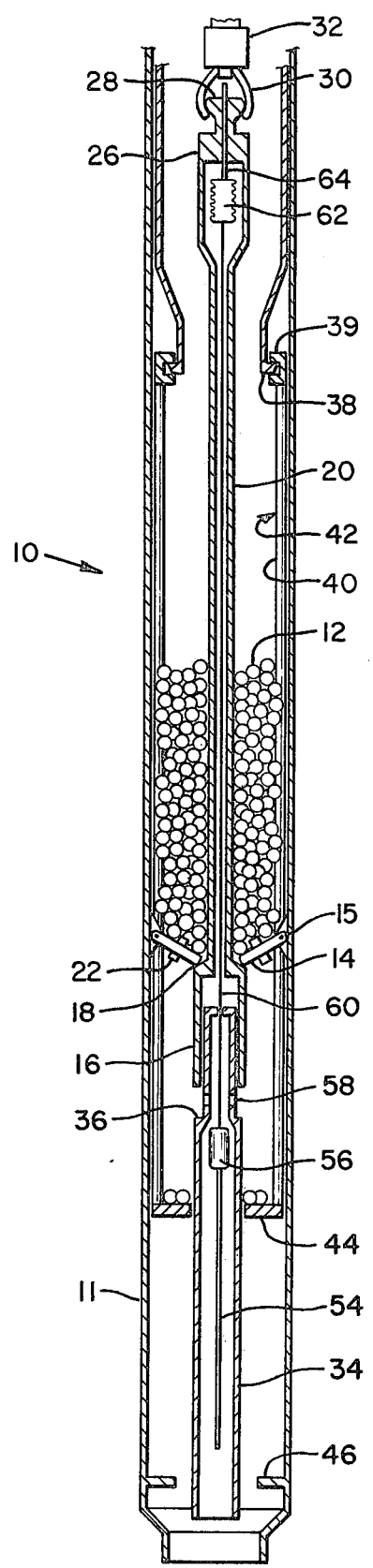
FIG. 4 shows an elevation view of the invention during the final step of the reset mode.

Referring now to FIG. 4, the lifting carriage 42 is lowered by action of the lift gripper 38 until the doors 14 rest on the valve shoulder 18, and continues to be lowered until the platform 44 returns to its initial position on the platform stop 46. The lift gripper 38 is then returned to its initial position as shown in FIG. 1. A few poison balls will remain on the platform 44 after it is lowered to the platform stop 46, but this will not significantly affect normal operation of the reactor core.

Figure 5:
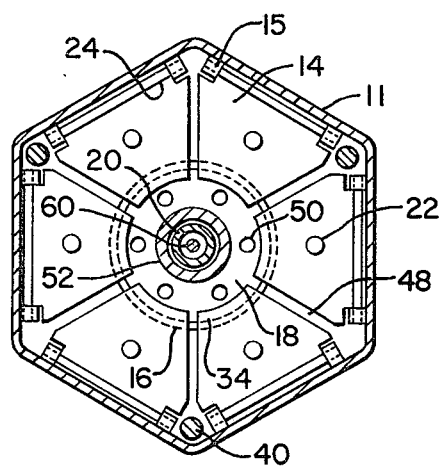
FIG. 5 shows a cross-section of FIG. 7 along the lines 5—5.

Referring now to FIG. 5, the relationship of the trap doors 14 and the lift arms 40 is shown. Six trap doors 14 are attached to the safety duct 11 by the hinges 15 and hinge pins 24. The side of the door 14 opposite the hinges 15 rests on the valve shoulder 18. The valve shoulder orifices 50 permit coolant flow to enter into the region above the trap doors 14 so the balls 12 may be cooled, and also allow coolant within the valve 16 to escape when the valve 16 is actuated in the event of a scram. The trap doors 14 are sized so that a slit 48 exists between each trap door 14 to permit free swinging of the hinges without possible interference by adjacent doors. The slots in a typical application will be less than ⅜ inches, the diameter of the poison balls 12. In three corners of the hexagonal safety duct 11, the shape of the trap doors 14 is modified to accommodate the lift arms 40 that form part of the lifting carriage 42 used for resetting the balls 12. The support rod 20 is attached to the center of the valve shoulder 18 and, in the preferred embodiment, is surrounded by a support rod shield 52 which is attached to the safety duct 11 but not to the shoulder 18. The shield 52 prevents the balls 12 from applying a frictional force to the support rod 20 and possibly interferring with the reliable actuation of the valve 16.

Figure 6:
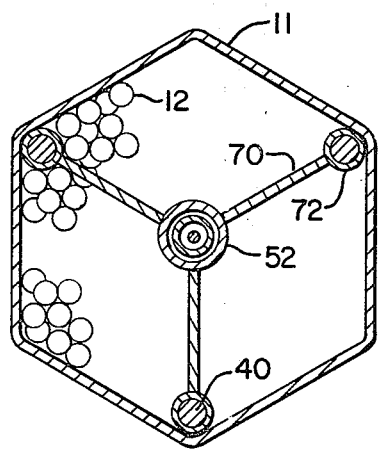
FIG. 6 shows a cross-section of the spider assembly along the lines 6—6 of FIG. 2.

One method of attaching the shield 52 to the safety duct 11 is shown in FIG. 6. The top end of the support rod shield 52 is used as the hub of a spider assembly 68 having spokes 70 connecting the rod shield 52 to lift arm shields 72, which surround the lift arms 40 in the region above the doors 14. The lift arm shields 72 are attached to duct tube 11 and, in addition to reducing friction between the lift arms 40 and the balls 12, help provide rigidity to the lift carriage 42. The spider assembly 68 is omitted in the other drawings except FIG. 2.

Figure 7:
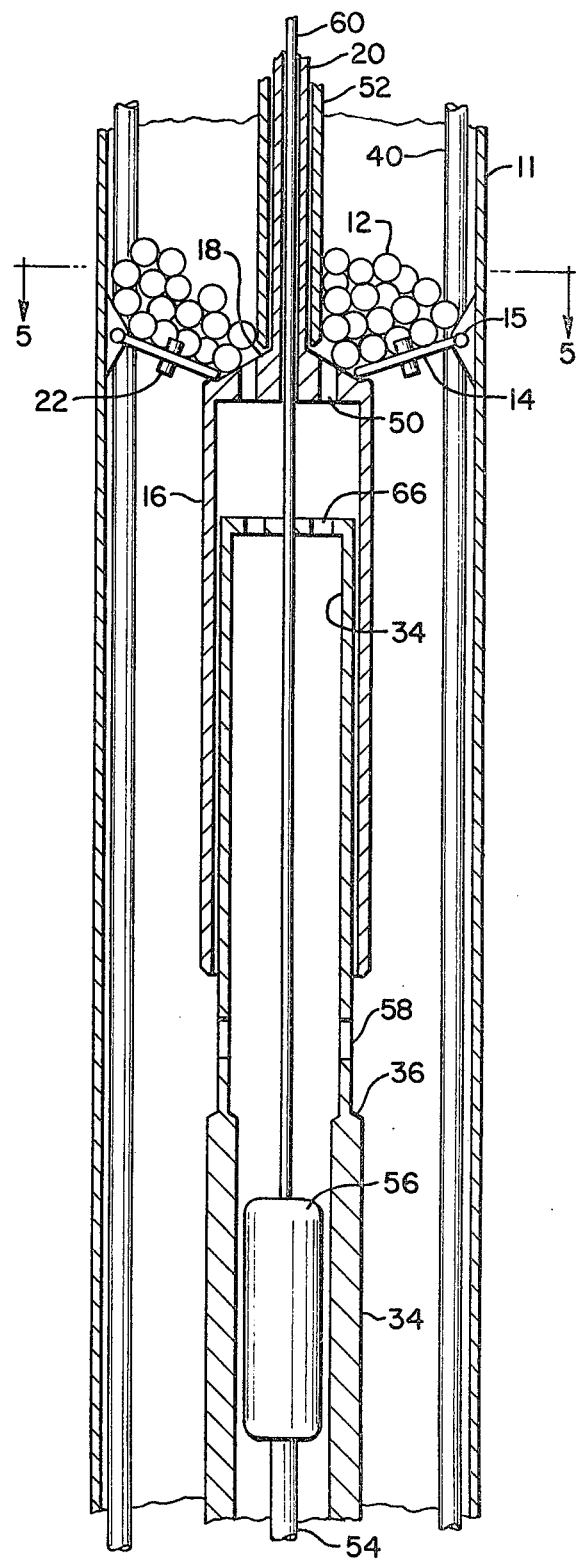
FIG. 7 shows the valve and trap door arrangement of FIG. 1 in greater detail.

Referring again to FIG. 1 and to FIG. 7, the operation of the invention will be described in the self-actuated scram mode. In this mode, the actuation signal for motion of the hopper valve 16 originates within the safety assembly 10 rather than from electrical signals as in the regular scram system. In the illustrated embodiment, reactor coolant enters the bottom of the safety assembly 10 and is directed by orifices (not shown) so that known flow rates pass outside inner column 34 up through perforations (not shown) in the platform stop 46 and platform 44, and within central column 34 wherein is disposed one or more sensor fuel pins 54. The sensor fuel pins 54 generate heat in proportion to the heat generated by the fuel assemblies that surround the safety assembly 10 and accordingly the temperature rise of the coolant within central column 34 is proporational to the average reactor coolant temperature rise. The heated reactor coolant passes over sensor bulb 56 and exits the central column 34 through orifices 58 located below the valve 16 (or orifices 66 when the valve 16 is in the down position). A sensor fluid such as NaK is confined within the sensor bulb 56 and the sensor tube 60, which extends up through the support rod 20 into the actuator housing 26 where the sensor tube 60 is in fluid communication with the inside of the actuator bellows 62. A push rod 64 is connected to the actuator bellows 62 is slidably disposed within the knob 28 such that at a predetermined expansion of the bellows 62 the tip of the push rod 64 will activate the pneumatic latch 32. The operation of the sensor fuel pin 54 and sensor bulb arrangement 56, 60 having an actuating bellows 62 and push rod 64 is more fully described in the co-pending application Ser. No. 805,251 of N. Giuggio, R. C. Noyes and S. U. Zaman entitled, "Temperature Sensitive Self-Actuated Scram Mechanism," assigned to the same assignee as the present application and filed on June 10, 1977. It will be evident to anyone familiar with this art that several different self-actuating devices can be used with the present invention. The self-actuated device illustrated in the present embodiment can be tested and is easily reset, and provides rapid scram on the occurrence of an over-temperature incident.

What is claimed is:

1. In a liquid metal-cooled nuclear reactor, apparatus for holding, releasing, and resetting a multiplicity of neutron absorbing masses for the rapid shutdown of the reactor core, comprising:

a. a safety duct vertically disposed within and in fixed relation to said reactor, said duct further having a substantially uniform cross-section extending from below said core to the top of said duct above said core;

b. a hopper valve positioned at a predetermined location above said core on the vertical axis of said duct, said valve having an upper portion forming shoulder means;

c. a plurality of trapdoors, each hinged at the same elevation to the inside of said duct for vertical movement such that when said valve is in said predetermined location said doors rest in a neutral position on said shoulder means whereby said doors and said valve block substantially the entire cross-section of said duct thereby providing support for said absorbing masses in the cocked position above said core;

d. actuating means located within said duct for maintaining the predetermined location of said valve and for reciprocally moving said valve a predetermined distance sufficient for said trapdoors to lose contact with said shoulder means;

e. a vertically moveable platform which blocks substantially the entire cross-section of the lower portion of said duct; and f. a first lifting means for vertically reciprocating said platform substantially between said hinges and below said reactor core.

2. The apparatus of claim 1 wherein said trap doors have stops for limiting the swing thereof.

3. The apparatus of claim 2 wherein said actuating means comprises:

a. an actuating rod attached to the top of said hopper valve and extending above said masses in the cocked position;

b. a first gripper means for selectively holding and releasing said actuating rod;

c. a second lifting means for selectively raising and lowering said first gripper means; and d. valve stop means for limiting the downward motion of said hopper valve, said stop means extending upward from below said core along the vertical axis of said duct.

4. The apparatus of claim 3 wherein said first lifting means comprises:

a. a lift carriage attached to said platform slideably disposed within said duct and having lift arms which extend above the level of said masses in the cocked position; and b. second gripper means for selectively raising and lowering said lift carriage.

5. The apparatus of claim 4 further comprising a spider assembly attached to said safety duct having a shield surrounding said actuating rod.

6. The apparatus of claim 5 wherein said spider assembly further comprises a lift arm shield surrounding each of said lift arms.

7. The apparatus of claim 3 wherein said stop means comprises:

a. a central column extending along the axis of said safety duct from an elevation below said reactor core to an elevation below said shoulder means, wherein said hopper valve has an open bottom adapted to slidingly enclose the upper end of said central column; and b. sensor means, located within said central column, said valve, and said actuating rod, for causing said first gripper means to release said actuating rod on the occurrence of a preset critical value of a system parameter.

* * * * *